July 5, 1949.
G. CHAUSSON
2,475,477
LANDING SHOCK ABSORBER
Filed Nov. 30, 1945
4 Sheets-Sheet 2
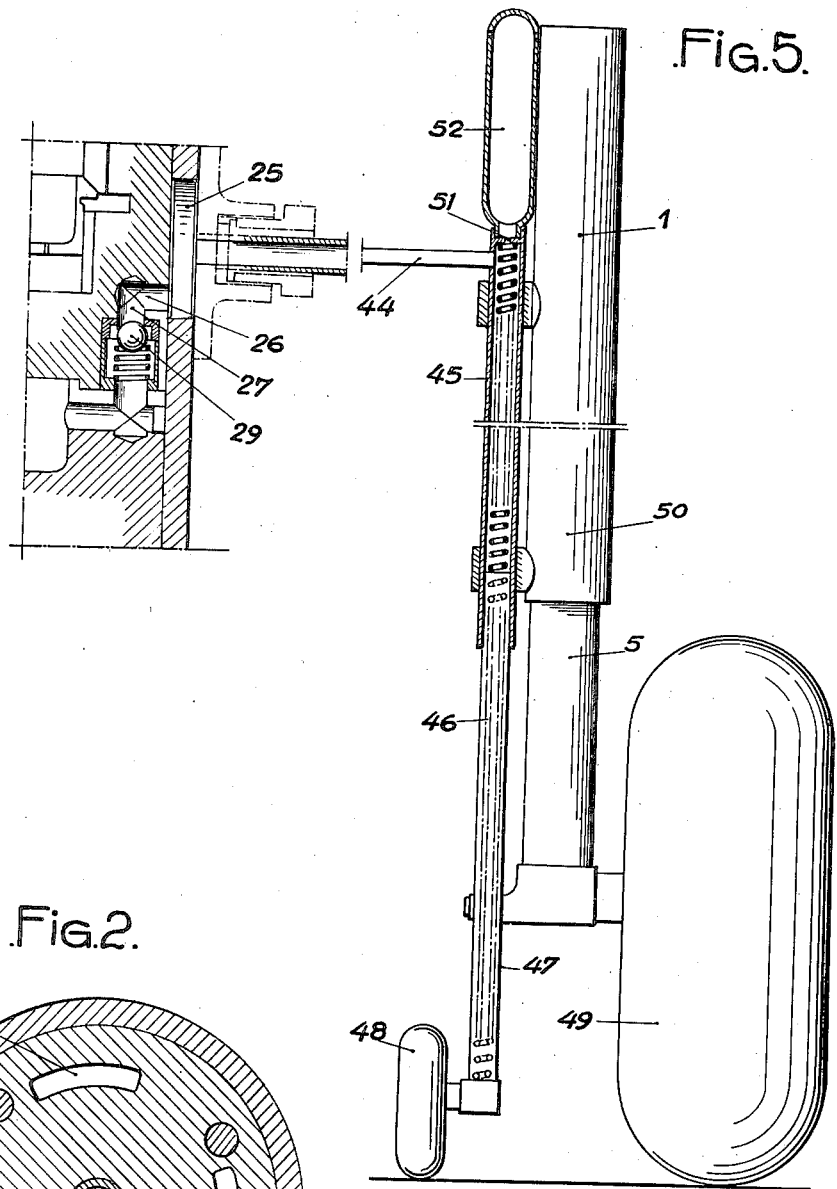
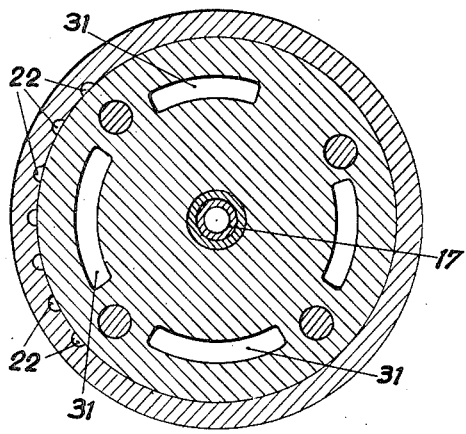
Inventor
Gaston Chausson
By Jno. Irvine
Atty

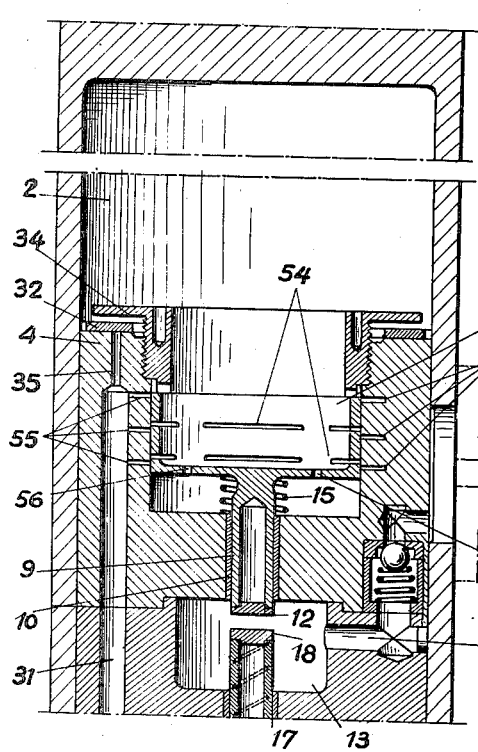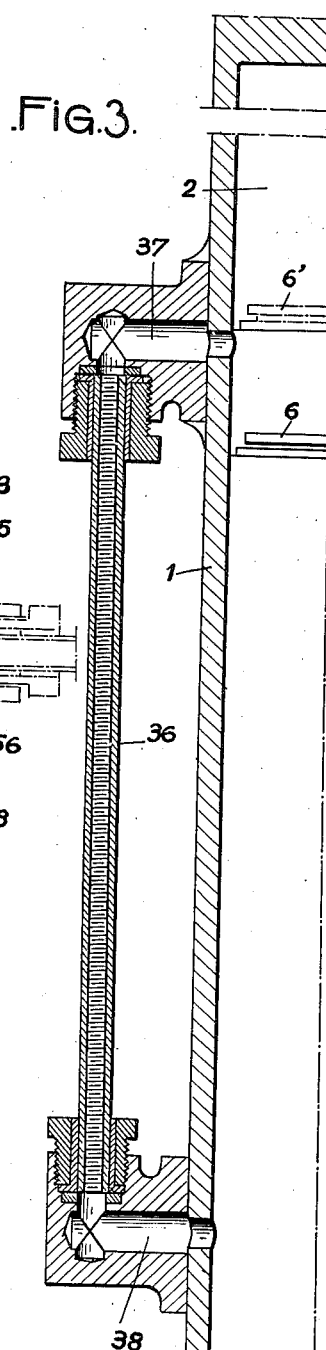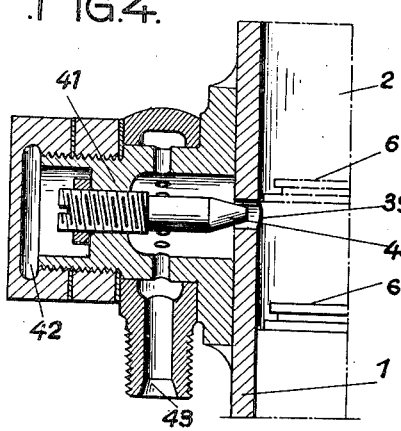

July 5, 1949.  G. CHAUSSON  2,475,477
LANDING SHOCK ABSORBER
Filed Nov. 30, 1945  4 Sheets-Sheet 4
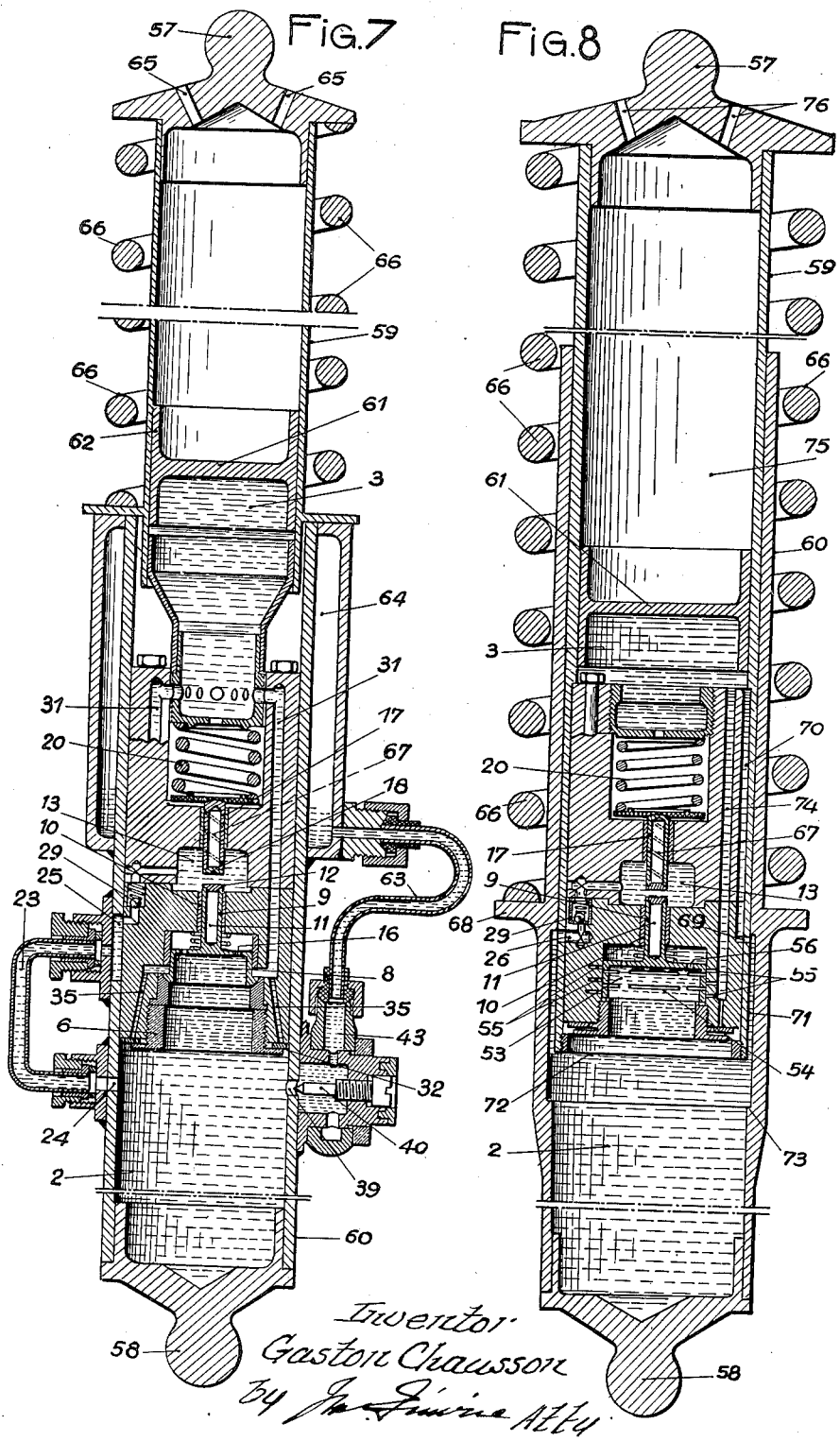
Inventor
Gaston Chausson Patented July 5, 1949

2,475,477

UNITED STATES PATENT OFFICE 2,475,477

LANDING SHOCK ABSORBER

Gaston Chausson, Asnieres, France, assignor to Societe Anonyme des Usines Chausson, Asnieres, France, a company of France Application November 30, 1945, Serial No. 631,890
In France February 25, 1944

Section 1, Public Law 690, August 8, 1946
Patent expires February 25, 1964

9 Claims. (Cl. 267—64)

This invention has for its object a device dissipating any kind of energy by the throttling of a fluid by ensuring a substantially constant reaction throughout the course of its operation. Said device is so arranged that the value of said reaction and, consequently, of the energy dissipated, is adjusted in function of the energy to be absorbed.

Although this device can be applied to any apparatus in which a violent impulse is directly transmitted to a mass of fluid, it can be constructed, in a particularly advantageous manner, in the form of a landing shock-absorber for airplanes, in which it allows optimum regularization of the absorption of the vertical energy of the airplane, throughout the stroke of said shock-absorber, whose action thus remains constant, so that use can be made, for ensuring the suspension of the airplane, of a resilient member of slight reaction, restituting, during the return stroke, but a small fraction of the energy to be absorbed.

In an energy dissipating device according to the invention, a piston sliding in a cylinder containing a liquid mass, under the action of a stress exerted on its rod and/or on the cylinder, comprises an adjusting obturator held applied on its seat in antagonism to the action of the delivery pressure during the first part of the delivery stroke of said piston by a pressure at least equal to that prevailing at that moment in the delivery chamber of the cylinder, which is generated in a balancing chamber provided in the piston, the liquid being delivered, during said first part of the delivery stroke of the piston, through ducts of small cross-section or a calibrated conduit ensuring a suitable loss of pressure, whereas during the second part of the delivery stroke the piston obturates said ducts or said calibrated conduits, then the balancing chamber is maintained under the pressure prevailing therein at the end of the first part of the piston stroke, so that the obturator opens under the action of the increased pressure generated in front of the piston, in function of the latter and in antagonism to the action of the initial pressure stored in the balancing chamber, said initial pressure tending to reclose the obturator as soon as the pressure lowers in front of the piston in function of said drop of pressure.

According to an embodiment, the initial pressure is transmitted to the balancing chamber during the first part of the delivery stroke of the piston through a by-pass conduit extending from the delivery chamber of the cylinder to said balancing chamber, said conduit being obturated by the piston itself at the end of the first part of its stroke and comprising a check-valve which subsequently prevents the pressure from lowering in the balancing chamber.

Moreover, the pressure prevailing in the balancing chamber is maintained by a plunger projecting in said chamber through a fluid-tight guide and taking a bearing on a calibrated spring arranged in a housing of the piston, which is compressed when the balancing chamber is initially placed under pressure, said spring then ensuring the compensation of the drop of pressure liable to take place therein during the second part of the delivery stroke of the piston by pushing back said plunger in function of said drop of pressure.

The obturator according to the present invention thus ensures a loss of pressure by throttling the fluid and is perfectly balanced, so that it constitutes, with its calibrated spring, a unit having its own very small suitably damped period. Its stroke is also very small, but uncovers very long orifices ensuring a sufficient outflow so that, during the second part of the piston stroke, the pressure remains constant on the upside of the obturator, that is to say in the delivery chamber of the cylinder.

The invention moreover presents numerous other features which are set forth in the following detailed description. It also includes, by way of new industrial product, the landing shock-absorbers for airplanes to which said energy dissipating device is applied. These shock-absorbers offer, in particular, the following advantages: a substantially constant reaction throughout the stroke; a reaction proportional to the energy to be absorbed (utilisation of the entire stroke whatever may be the energy); a slight resilient reaction ensuring, in combination with an accessory mechanical, pneumatic or hydraulic element, great smoothness in the suspension during rolling.

Embodiments of the subject-matter of the invention are illustrated, by way of examples, in the accompanying drawings.

Fig. 2 is a cross section along line II—II of Fig. 1.

Figs. 3, 4, 5 and 6 are vertical sections illustrating detail modifications.

Figs. 7 and 8 illustrate, in vertical section, two landing shock-absorbers for airplanes.

Figure 1:
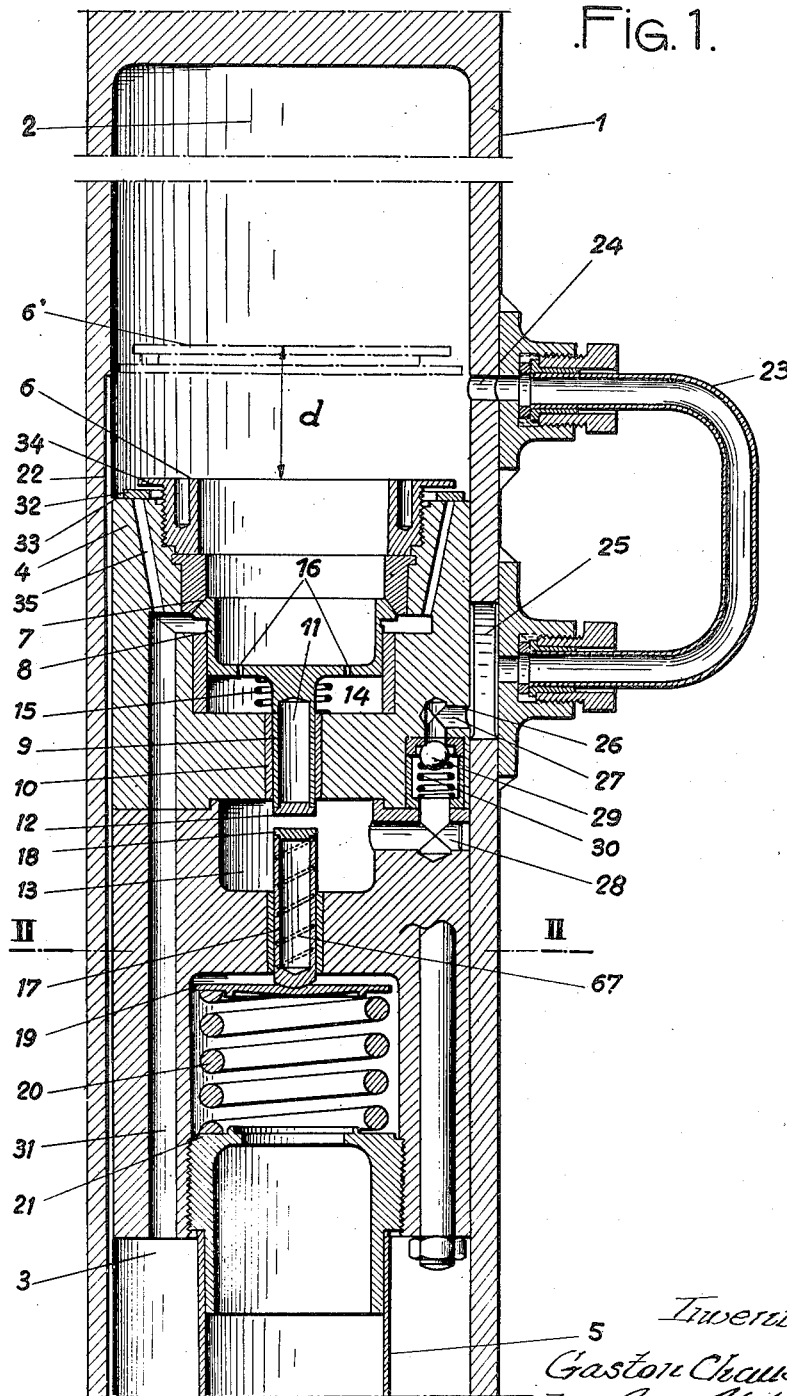
Fig. 1 is a vertical section of a self-regulating energy dissipating device in accordance with the invention.

According to Fig. 1, the self-regulating energy dissipating device comprises a cylinder 1 in which the energy dissipating fluid must pass from a chamber 2 to a chamber 3, which are separated by a piston 4 having a rod 5. The cylinder 1 is, for instance, secured to one of the constructional elements and the piston rod 5 to the other constructional element, between which the energy to be dissipated is developed.

Piston 4 has a hollow bottom 6 on the underside of which is provided a conical seat 7 against which takes a bearing a flap-valve 8 in the shape of a cup and having a truncated flange pressing against said seat. Said flap-valve comprises a tail-piece 9 sliding in a guide 10. The tail-piece 9, recessed at 11, has a solid bottom 12 projecting in the form of a plunger in a chamber 13. Moreover a chamber 14 is provided below the flap-valve 8 and a light spring 15, taking a bearing on the bottom of said chamber 14, tends to push said flap-valve against its seat. Holes 16, perforated in the bottom of the flap-valve put chamber 2 in communication with chamber 14.

A plunger 17 also projects into chamber 13 with its bottom 18 turned towards the bottom 12 of tail-piece 9. Said piston 17 takes a bearing by means of a circular sole 19 on a calibrated spring 20 taking a bearing, at its other end, on a seat 21 of the piston. Flutes 22, hollowed out in the inner wall of cylinder 1 ensure a throttled communication between chamber 3 and chamber 2, up to a certain distance above the lower dead center of the piston. Moreover, a by-pass conduit 23 leaves chamber 2 at 24, substantially at the upper level of the flutes 22, and opens into a port 25 of cylinder 1 communicating with an orifice 26 of the piston connected by a pipe-line 27, 28 to chamber 13 of the piston. A check-valve 29 having a spring 30 is interposed in said pipe-line 27, 28.

The device of Figs. 1 and 2 operates in the following manner:

When an energy tends to push piston 4 upwardly in cylinder 1, the driving back of said piston creates a pressure in the fluid contained in chamber 2. Said pressure is propagated under the flap-valve 8 through the holes 16. Moreover, it is also communicated, through the by-pass 23 and pipe-line 27, 28, by opening the check-valve 29, to chamber 13 in which it acts, on the one hand, against the bottom 12 of the tail-piece of flap-valve 8 and, on the other hand, against the bottom 18 of piston 17. Consequently, piston 17 is driven back, compressing its spring 20, then flap-valve 8 is held applied on its seat owing to the fact that the pressure propagated under said valve through holes 16 and in chamber 13 balances the pressure acting above it in chamber 2. Consequently, the liquid under pressure in chamber 2 can only pass into chamber 3 through the narrow flutes 22 in which it is throttled, the cross-section and number of said flutes being such that for the initial speed of displacement of the piston, a loss of head is obtained, which is proportional to the square of said initial speed. The displacement of piston 4 in cylinder 1 is, therefore, considerably braked. When said piston has moved to the distance d and that its bottom has risen to the position 6' above, on the one hand, the upper ends of flutes 22, on the other hand, the inlet 24 of by-pass 23, the fluid under pressure contained in chamber 2 can no longer flow through said flutes and said by-pass, so that the pressure tends to rise in said chamber. As check-valve 29 is no longer pushed back by the stream, it has closed and, consequently, the initially adjusted pressure is maintained in chamber 13. It is therefore only when the pressure created in chamber 2 becomes greater than that existing in said chamber 13, that flap-valve 8 will be pushed downwardly lifting more or less from its seat 7 in function of the difference of said pressures. The fluid under pressure then passing between flap-valve 8 and its seat can directly enter chamber 3 by passing through ducts 31 passing through the piston.

But as soon as the pressure prevailing in chamber 2 tends to lower below the initially adjusted pressure in chamber 13, the latter pushes back the bottom 12 of the tail-piece of flap-valve 8 which tends to close and, consequently, to cause the pressure in chamber 2 to rise by increasing the throttling. The fluid contained in chamber 2 can therefore flow through the ducts 31 only when the pressure prevailing in chamber 2 approximates that prevailing in chamber 13. The pressure existing in this latter chamber is maintained in case of a slight drop due to leakages through the plunger 17 which has been initially driven back by the adjusted pressure in said chamber and which is pushed into the latter by its spring 20 in proportion as said pressure tends to lower.

Consequently, in case of variations of the energy developed between the two constructional elements between which the dissipating device is interposed, flap-valve 8 effects damped oscillating movements having the effect of more or less opening or closing the annular duct provided between its truncated flange and its truncated seat, by thus throttling the section of passage-way for the liquid under pressure contained in chamber 2, by the ducts 31 in function of said energy variations. The dimensions of flap-valve 8 are moreover so calculated that the displacements thereof are very slight relatively to the initial sagging of spring 20, so that the reaction of the latter, which in fact regulates the pressure in chamber 13, remains approximately constant, as well as the pressure prevailing in chamber 2.

The weak spring 15 is intended to hold flap-valve 8 applied against its seat in inoperative position.

When piston 4 returns to its starting position, an annular flap-valve 32 lifts from the end 33 of piston 4 and is retained by a flange 34 of the latter, so that the liquid can again pass from chamber 3, through ducts 31 and ducts 35, directly in chamber 2; ducts 35 are gauged in order to suitably check the return stroke of piston 4, in position of rest, and as soon as the piston tends to rise, the annular flap-valve 32 presses against the part 33 of the piston and obturates ducts 35.

In Fig. 3, the flutes 22 provided within the cylinder according to Figs. 1 and 2, are replaced by a tube 36 placed outside cylinder 1 and to which it is connected by connections 37, 38. The inner diameter and profiles of said tube 36 are such that it fulfills the same function as the flutes. Its inner profile is, for instance, rough, in particular threaded, so as to obtain a loss of head proportional to the square of the initial speed of the piston.

According to Fig. 4, the placing under pressure of chamber 2, as well as chamber 13 communicating therewith, can be initially adjusted by compelling the liquid contained in said chamber to pass through an orifice 39 of small cross-section, arbitrarily adjusted by means of a needle 40 capable of being screwed in an internally threaded member 41, the access to said needle being closed by a cover 42. The liquid passing through the throttle 39 enters a duct 43 which leads it to chamber 3 in the same manner as conduit 36 of Fig. 3. The adjustment of said throttled cross-section allows of causing the pressure obtained in chamber 2 and, consequently, in chamber 13, to vary in function of another parameter than the initial speed, for instance in function of the bulk of the member the kinetic energy of which is to be absorbed, and said bulk can be, in the case of an airplane shock-absorber, the bulk of the latter.

According to a modification, regulating chamber 13 can be initially placed under pressure, not by a by-pass supplying liquid under pressure generated in chamber 2 in which acts the delivery of the piston, but by an extraneous source of fluid under pressure.

Fig. 5 shows an embodiment of this modification in which the orifice 26, leading by means of the pipe-line 27 and check-valve 29 to chamber 13, commuciates through port 25 with a conduit 44 coming from an auxiliary cylinder 45 in which the liquid is delivered by a piston 46 the rod 47 of which is rigid with a roller 48 taking a bearing on the ground by the side of the main wheel 49 supported by the main shock-absorber 50. A calibrated orifice 51 controls the access of the liquid to an overhead tank 52.

When the airplane lands, the roller 48 bears on the ground at the same time as the main wheel 49, so that the piston 46 is pushed into its cylinder 45 parallel to the movements imparted to piston 4 entering cylinder 1 of the main shock-absorber 50. The liquid contained in cylinder 45 is driven, with a speed corresponding to the vertical speed of the airplane, through the throttle 51 into the tank 52. The throttle 51 creates in cylinder 45 a pressure proportional to the square of the speed of passage, therefore to the square of the vertical speed of the airplane. Said pressure is transmitted to chamber 13 through conduit 44, orifice 26, and pipe-line 27. In this case an adjustment of the pressure created in chamber 13 is therefore also obtained which is directly proportional to the square of the vertical speed of the airplane and, consequently, to the energy to be absorbed.

Fig. 6 illustrates a modification in which the flap-valve 8 of Fig. 1 is replaced by a slide-valve 53 having ports 54. On the other hand, ports 55 are provided in the piston and communicate with the ducts 31. When the slide-valve 53 lowers under the action of the pressure created in chamber 2 and in antagonism to the pressure prevailing in the self-regulating chamber 13, its upper edge first of all uncovers the upper ports 55 of the piston then, as it continues to lower, its own ports 54 more or less coincide with the other ports 55 of the piston. The slide-valve 53 comprises in its bottom orifices 56 fulfilling the same function as the orifices 16 of flap-valve 8. Moreover, the operation is identical to that described with reference to Fig. 1.

Fig. 7 illustrate a hydro-mechanical shock-absorber for airplanes to which is applied the energy dissipating device.

Said shock-absorber comprises at its ends a ball 57, for instance connected to the frame of the airplane, and a ball 58 connected to the train of wheels. Ball 57 is rigid with a cylinder 59 telescopically engaging in a cylinder 60 rigid with ball 58. Piston 6 of Fig. 1 is rendered rigid with cylinder 59. Chamber 2 of Fig. 1 is illustrated by the interior of cylinder 60 and the enclosure 3 is placed between piston 6 and a diaphragm 61 freely sliding, by means of a cylindrical guide 62, in cylinder 59. By-pass 23 of Fig. 1 opens into chamber 2 at 24, as in said figure, and also communicates, as in the latter, through port 25 and check-valve 29, with the balancing chamber 13 in which project the tail-piece 11 having a bottom 12 of flap-valve 8 and the plunger 17 having a bottom 18 controlled by the spring 20. This part of the device therefore operates in an identical manner to the energy dissipating device of Fig. 1.

Furthermore, cylinder 60 comprises a calibrated orifice 39 having an adjusting needle 40, according to Fig. 4, which communicates through the tube 43 with a tube 63 leading to an annular tank 64.

This shock-absorber operates as follows:

At the beginning of the impact, cylinder 59 tends to lower into cylinder 60, which drives the oil from chamber 2 into tank 64.

The pressure prevailing in chamber 2 acts on the underside of flap-valve 8, and, by propagating through holes 16, on the top of said flap-valve, as well as, in chamber 13, on the edge 12 of tail-piece 11 of said flap-valve. The flap-valve 8 has therefore no tendency to lift from its seat and the liquid is compelled to pass through the throttle 39 adjusted by the needle 40 in order to enter the closed cylindrical chamber 64. The passage of oil through the throttle 39 generates in chamber 2 a pressure which is proportional to the square of the speed of the liquid, therefore to the speed with which cylinder 59 is driven down, and which in its turn is function of the initial vertical speed of the airplane. Said pressure is transmitted, through the by-pass 23, to chamber 13 wherein it has for effect to push back the plunger 17, 18 and to compress spring 20.

After a given stroke of the piston 6, which is relatively small with respect to the entire stroke of the shock-absorber, the orifices 24 and 39 are obturated by piston 8, but the pressure prevailing in chamber 13 remains constant owing to the closing of valve 29 and the compensating action of spring 20 previously described. It results therefrom that the pressure necessary in chamber 2 for lifting the flap-valve 8 must be slightly greater than the pressure prevailing in chamber 13. When this higher pressure prevails in chamber 2, flap-valve 8 lifts and allows the liquid to pass, said liquid entering the enclosure 3 through conduits 31.

Owing to the constant pressure prevailing in chamber 13, the pressure is maintained constant in chamber 2, flap-valve 8 automatically adjusting its opening according to the outflow of liquid to be ensured, in order that the pressure equilibrium should be maintained constant.

In the enclosure 3, the oil pushes back the diaphragm 61 which only acts for separating said oil from the air contained in cylinder 59 in order to avoid emulsions. Above said diaphragm 61, cylinder 59 communicates with the atmosphere through orifices 65.

Furthermore, during the driving in of cylinder 59, the spring 66 placed around said cylinder is compressed, so as to ensure the operation when the shock-absorber returns to its normal position.

It is to be noted that the braking stress due to the throttling of the liquid being constant until the end of the stroke, spring 66 need not be sufficient for ensuring the suspension of the airplane under its own weight, and it is unnecessary for said spring to intervene in the shock-absorbing action upon landing.

This arrangement moreover has the advantage of resiliently storing a small proportion of the total energy and, consequently, of encountering but few difficulties for ensuring the braking upon return and avoiding rebound.

Upon return, the liquid passes through conduits 31, then through calibrated ducts 35 which ensure the braking, at the same time as the annular flap-valve 32 which is intended to obturate the ducts 35 during the forward stroke.

In order to ensure the smoothness of the suspension when rolling, chamber 13 is not completely fluid-tight; a slight leakage is provided between piston 18 and its guide, said leakage being sufficiently slight for the pressure to lower only to a slight extent during the landing period, but it is sufficient for the pressure to be reduced at the end of a suitable time. When said time has elapsed the pressure has dropped in chamber 13, which permits flap-valve 8 to allow the liquid to pass under slight pressure. Said leakage can be provided by arranging a helical groove 67 around rod 17.

The suspension is mainly ensured by spring 66 the return stroke of which is braked by the throttling of the liquid produced by the calibrated ducts 35. During rolling, the shock-absorber is constantly driven in, so that orifices 24 and 39 are obturated.

Fig. 8 illustrates an example of an airplane shock-absorber which can be, according to circumstances, a hydro-mechanical or oleo-pneumatic shock-absorber. In contradistinction to Fig. 7, use is made here of a cylinder 59 telescopically entering a cylinder 60 and a spring 66 placed around said cylinders and taking a bearing on a shoulder 68 of cylinder 60.

Said shock-absorber utilises the slide-valve 53 of Fig. 6. At the beginning of the operation, the slide-valve 53 is completely balanced and remains closed. The liquid is therefore compelled to pass through the throttled orifice 69 and then through the ducts 70 which ensures the initial placing under pressure of chamber 2, pressure which is transmitted to chamber 13 through the medium of the enclosure 71 and pipeline 26 to the check-valve 29. When the bottom 72 of the piston takes a bearing on shoulder 73 of cylinder 60, enclosure 71 is obturated, so that the liquid is compelled to open the slide-valve 53 and to pass through the ports 54, 55. The opening pressure of said slide-valve is adjusted by the initial pressure prevailing in chamber 13 and is maintained constant throughout the stroke, as explained in the foregoing. The liquid then passes through conduits 74 into the enclosure 3 wherein it is insulated from the atmosphere by a diaphragm 61, as in the preceding example.

In the hydro-mechanical embodiment, the chamber 75 communicates with the atmosphere through orifices 76 and the suspension is ensured by the spring 66.

In the oleo-pneumatic embodiment, spring 66 is done away with, as well as the orifices 76, so that chamber 75 is fluid-tight. Said chamber therefore operates as a pneumatic shock-absorber; the initial pressure prevailing therein, as well as the volume thereof, are calculated in order to obtain optimum suspension conditions.

The smoothness of rolling on the ground is obtained in the same manner as in the preceding example, by providing a leakage allowing, at the end of a given time, of causing the pressure prevailing in chamber 13 to lower.

Various modifications can be made in the embodiments described, without departing from the spirit and scope of the invention as defined in the claims. Furthermore, although the energy dissipating device described be applied with considerable advantage to airplane shock-absorbers, it is obvious that it can receive, whilst remaining within the scope of the invention, many other applications in every case where it is necessary to adjust the action of a hydraulic device transmitting any type of energy or acting in antagonism thereto.

What I claim and desire to secure by Letters Patent of the United States is:

1. An energy dissipation device for landing shock absorbers of airplanes, which comprises a cylinder, a piston, a delivery chamber and a receiving chamber in said cylinder on each side of the piston, a throttling passage between said chambers ending at an intermediate part of the delivery chamber, one passage of larger cross-section in the piston, an adjusting obturator having a seat in said piston for controlling the last-named passage, a balancing chamber in the piston, means to admit in said balancing chamber a pressure holding the obturator applied on its seat in antagonism to the action of the pressure in the delivery chamber during the first part of the delivery stroke of the piston, the balancing chamber being closed against admitted pressure when the supply of pressure thereto is cut off, means to compensate the loss of pressure in the closed balancing chamber, direct return channels by-passing the obturator and means closing said channels during operative conditions.

2. An energy dissipating device for landing shock absorbers of airplanes, which comprises a cylinder rigidly connected to a frame member of an airplane, a piston connected to another frame member of the airplane, a delivery chamber and a receiving chamber in said cylinder on each side of the piston, at least a throttling passage between said chambers ending at an intermediate part of the delivery chamber, at least one passage of larger cross-section in the piston, an adjusting obturator having a seat in said piston for controlling the last-named passage, a balancing chamber in the piston, a by-pass conduit leading from the delivery chamber to said balancing chamber, said by-pass ending at the same intermediate part of the delivery chamber as the throttling passage to be obturated simultaneously with the latter by the piston itself at the end of the first part of its stroke, a check-valve preventing the pressure from lowering in the balancing chamber when the supply of pressure thereto is cut off, a plunger projecting in said balancing chamber, a bearing plate for said plunger, a calibrated spring supporting said plate and taking a bearing at its other end, on a seat of the piston, an helical groove around plunger to provide a slight leakage between said plunger and its guide, direct return channels by-passing the obturator and an annular flap-valve closing said channels during shock absorbing.

3. An energy dissipating device according to claim 2, comprising a chamber provided below the obturator, a light spring taking a bearing on the bottom of said chamber and pushing the obturator against its seat, and holes in the bottom of said obturator.

4. An energy dissipating device for landing shock absorbers of airplanes, which comprises a cylinder rigidly connected to a frame member of an airplane, a piston connected to another frame member of the airplane, a hollow bottom and a conical seat in said piston, a delivery chamber and a receiving chamber in said cylinder on each side of the piston, at least a throttling passage between said chambers ending at an intermediate part of the delivery chamber, at least one passage of larger cross-section in the piston, an adjusting obturator having a seat in said piston for controlling the last-named passage, a balancing chamber in the piston, a tail-piece integral with said obturator and provided with a recess and a solid bottom projecting as a plunger in said balancing chamber, a by-pass conduit leading from the delivery chamber to said balancing chamber, said by-pass ending at the same intermediate part of the delivery chamber as the throttling passage to be obturated simultaneously with the latter by the piston itself at the end of the first part of its stroke, a check-valve preventing the pressure from lowering in the balancing chamber when the supply of pressure thereto is cut off, a plunger projecting in said balancing chamber, a bearing plate for said plunger, a calibrated spring supporting said plate and taking a bearing, at its other end, on a seat of the piston, an helical groove around plunger to provide a slight leakage between said plunger and its guide, direct return channels by-passing the obturator and an annular flap-valve closing said channels during shock absorbing.

5. An energy dissipating device for landing shock absorbers of airplanes, which comprises a cylinder rigidly connected to a frame member of an airplane, a piston connected to another frame member of the airplane, a delivery chamber and a receiving chamber in said cylinder on each side of the piston, a profiled tube having a rough inner wall so as to provide a throttled communication between said chambers and to obtain a loss of head proportional to the square of the initial speed of the piston, said profiled tube being connected to an intermediate part of the delivery chamber, at least one passage of larger cross-section in the piston, an adjusting obturator having a seat in said piston for controlling the last-named passage, a balancing-chamber in the piston, means to generate in said balancing chamber a pressure holding the obturator applied on its seat in antagonism to the action of the pressure in the delivery chamber during the first part of the delivery stroke of the piston, means closing the balancing chamber when the supply of pressure thereto is cut off, means to compensate the loss of pressure in the closed balancing chamber, direct return channels by-passing the obturator and means closing said channels during shock absorbing.

6. An energy dissipating device according to claim 5, comprising in the connection between the profiled tube having a rough inner wall and the delivery chamber an orifice of small cross-section and provided with an adjusting needle, which is screwed in an internally threaded part.

7. An energy dissipating device for landing shock absorbers of airplanes, which comprises a cylinder rigidly connected to a frame member of an airplane, a piston connected to another frame member of the airplane, a delivery chamber and a receiving chamber in said cylinder on each side of the piston, at least a throttling passage between said chambers ending at an intermediate part of the delivery chamber, at least one passage of larger cross-section in the piston, a slide-valve having ports and sliding in said piston for controlling the last-named passage through ports provided in the piston which are progressively uncovered by said slide-valve and its ports, a balancing chamber in the piston, means to generate in said balancing chamber a pressure holding the obturator applied on its seat in antagonism to the action of the pressure in the delivery chamber during the first part of the delivery stroke of the piston, means closing the balancing chamber when the supply of pressure thereto is cut off, means to compensate the loss of pressure in the closed balancing chamber, direct return channels by-passing the obturator and means closing said channels during shock absorbing.

8. A shock absorber for airplanes provided with an energy dissipating device according to claim 1, which comprises a cylinder connected to the frame of the airplane and rigid with a piston, a second cylinder connected to the train of wheels and in which the first-named cylinder and said piston are slidingly engaged, a delivery chamber in the second cylinder, a diaphragm freely sliding in the first cylinder, a cylindrical guide for said diaphragm, a receiving chamber in the first cylinder between the piston and the sliding diaphragm, a chamber communicating with the atmosphere above said sliding diaphragm in the first cylinder, an annular tank around the second cylinder, a connection between the delivery chamber and said tank, a calibrated orifice provided with an adjusting needle in said connection, a compression spring between a flange of the first cylinder and a seating on the second cylinder.

9. A shock absorber for airplanes having an energy dissipating device, which comprises a cylinder connected to the frame of the airplane and rigid with a piston, a second cylinder connected to the train of wheels and in which the first-named cylinder and said piston are slidingly engaged, a delivery chamber in the second cylinder, a diaphragm freely sliding in the first cylinder, a cylindrical guide for said diaphragm, a receiving chamber in the first cylinder between the piston and the sliding diaphragm, a chamber communicating with the atmosphere above said sliding diaphragm in the first cylinder, throttled orifice and ducts between the delivery chamber and the receiving chamber, at least one conduit of larger section in the piston, a slide-valve having ports and sliding in said piston for controlling the conduit of larger section through ports provided in the piston which are progressively uncovered by said slide-valve and its ports, a balancing chamber in the piston, a space around the piston, with a pipe-line controlled by a check-valve, transmitting the pressure generated in the delivery chamber to the balancing chamber, a shoulder in the second cylinder to limit the stroke of the piston, a compression spring between a flange of the first cylinder and a seating on the second cylinder.

GASTON CHAUSSON.

REFERENCES CITED

The following references are of record in the file of this patent:

UNITED STATES PATENTS

| Number | Name | Date |
| --- | --- | --- |
| 1,112,705 | Kinkaid | Oct. 6, 1914 |
| 2,352,401 | O'Connor | June 27, 1944 |
| 2,363,308 | Focht | Nov. 21, 1944 |

FOREIGN PATENTS

| Number | Country | Date |
| --- | --- | --- |
| 408,592 | Britain | Apr. 5, 1934 |
| 673,485 | France | Oct. 8, 1929 |